(12) United States Patent
Hayashi et al.

(10) Patent No.: US 7,940,292 B2
(45) Date of Patent: May 10, 2011

(54) OPTICAL SCANNING DEVICE AND IMAGE FORMING APPARATUS

(75) Inventors: Yoshinori Hayashi, Kanagawa (JP); Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/478,304

(22) Filed: Jun. 4, 2009

(65) Prior Publication Data
US 2009/0315967 A1    Dec. 24, 2009

(30) Foreign Application Priority Data
Jun. 23, 2008  (JP) ................. 2008-163188

(51) Int. Cl.
*B41J 15/14*    (2006.01)
*B41J 27/00*    (2006.01)

(52) U.S. Cl. .................. 347/241; 347/256

(58) Field of Classification Search ............ 347/230, 347/241–244, 256–261, 233, 234, 248; 359/204.1
See application file for complete search history.

(56) References Cited

U.S. PATENT DOCUMENTS

| | | | |
|---|---|---|---|
| 5,504,613 A * | 4/1996 | Itabashi et al. | ............. 359/210.1 |
| 5,557,448 A | 9/1996 | Endo et al. | |
| 5,570,224 A | 10/1996 | Endo et al. | |
| 5,581,392 A | 12/1996 | Hayashi | |
| 5,652,670 A | 7/1997 | Hayashi | |
| 5,875,051 A | 2/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,185,026 B1 | 2/2001 | Hayashi et al. | |
| 6,198,562 B1 | 3/2001 | Hayashi et al. | |
| 6,369,927 B2 * | 4/2002 | Hayashi | ............. 359/196.1 |
| 6,400,391 B1 | 6/2002 | Suhara et al. | |
| 6,462,853 B2 | 10/2002 | Hayashi | |
| 6,509,995 B1 * | 1/2003 | Suzuki et al. | ............. 359/207.2 |
| 6,587,245 B2 | 7/2003 | Hayashi | |
| 6,657,765 B2 | 12/2003 | Hayashi et al. | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,407 B2 | 8/2004 | Hayashi et al. | |
| 6,788,444 B2 | 9/2004 | Suzuki et al. | |

(Continued)

FOREIGN PATENT DOCUMENTS

JP    2002287055 A * 10/2002

(Continued)

OTHER PUBLICATIONS

U.S. Appl. No. 09/031,410, filed Feb. 26, 1998, Kohji Sakai.

(Continued)

*Primary Examiner* — Hai C Pham
(74) *Attorney, Agent, or Firm* — Oblon, Spivak, McClelland, Maier & Neustadt, L.L.P.

(57) ABSTRACT

An optical scanning device includes a lens having a negative optical power at least in a sub-scanning direction and a lens having a positive optical power at least in the sub-scanning direction between a light source and a deflecting unit. The optical scanning device further includes a coupling lens and an adjusting lens whose positions can be adjusted in an optical axis direction and then bonded with ultraviolet curing resin. Therefore, the magnification of an optical system can be adjusted and consequently a desired scan-line interval can be obtained.

14 Claims, 7 Drawing Sheets

U.S. PATENT DOCUMENTS

| | | | |
|---|---|---|---|
| 6,803,941 B2 | 10/2004 | Hayashi et al. | |
| 6,903,856 B2 * | 6/2005 | Hayashi | 359/204.1 |
| 6,906,739 B2 | 6/2005 | Suzuki et al. | |
| 6,934,061 B2 | 8/2005 | Ono et al. | |
| 6,956,685 B2 | 10/2005 | Hayashi | |
| 6,987,593 B2 | 1/2006 | Hayashi et al. | |
| 7,006,120 B2 | 2/2006 | Sakai et al. | |
| 7,050,210 B2 | 5/2006 | Atsuumi et al. | |
| 7,068,296 B2 | 6/2006 | Hayashi et al. | |
| 7,088,484 B2 | 8/2006 | Hayashi et al. | |
| 7,106,483 B2 | 9/2006 | Hayashi et al. | |
| 7,145,705 B2 | 12/2006 | Hayashi | |
| 7,154,651 B2 * | 12/2006 | Atsuumi et al. | 359/204.1 |
| 7,218,432 B2 | 5/2007 | Ichii et al. | |
| 7,236,281 B2 | 6/2007 | Hayashi et al. | |
| 7,253,937 B2 | 8/2007 | Ueda et al. | |
| 7,271,823 B2 | 9/2007 | Izumi et al. | |
| 7,271,824 B2 | 9/2007 | Omori et al. | |
| 7,362,486 B2 | 4/2008 | Hayashi et al. | |
| 7,417,777 B2 | 8/2008 | Saisho et al. | |
| 7,443,558 B2 | 10/2008 | Sakai et al. | |
| 7,471,434 B2 | 12/2008 | Nakamura et al. | |
| 7,495,813 B2 | 2/2009 | Akiyama et al. | |
| 7,529,011 B2 | 5/2009 | Fujii | |
| 7,532,227 B2 | 5/2009 | Nakajima et al. | |
| 2003/0053156 A1 | 3/2003 | Satoh et al. | |
| 2006/0232659 A1 | 10/2006 | Hayashi et al. | |
| 2006/0284968 A1 | 12/2006 | Hayashi et al. | |
| 2007/0058255 A1 | 3/2007 | Imai et al. | |
| 2007/0064291 A1 * | 3/2007 | Kashimura | 359/204 |
| 2007/0211325 A1 | 9/2007 | Ichii | |
| 2007/0253047 A1 | 11/2007 | Ichii et al. | |
| 2007/0253048 A1 | 11/2007 | Sakai et al. | |
| 2007/0297036 A1 | 12/2007 | Nakamura et al. | |
| 2008/0024849 A1 | 1/2008 | Hayashi et al. | |
| 2008/0025759 A1 | 1/2008 | Ichii et al. | |
| 2008/0055672 A1 | 3/2008 | Watanabe et al. | |
| 2008/0062491 A1 | 3/2008 | Nakamura et al. | |
| 2008/0068689 A1 | 3/2008 | Saisho et al. | |
| 2008/0068690 A1 | 3/2008 | Ichii | |
| 2008/0068693 A1 | 3/2008 | Hayashi et al. | |
| 2008/0100895 A1 | 5/2008 | Hayashi et al. | |
| 2008/0123159 A1 | 5/2008 | Hayashi et al. | |
| 2008/0180772 A1 | 7/2008 | Miyatake et al. | |
| 2008/0192319 A1 | 8/2008 | Miyatake et al. | |
| 2008/0204840 A1 | 8/2008 | Watanabe et al. | |
| 2008/0204841 A1 | 8/2008 | Suzuki et al. | |
| 2008/0204842 A1 | 8/2008 | Arai et al. | |
| 2008/0212999 A1 | 9/2008 | Masuda et al. | |
| 2008/0218827 A1 | 9/2008 | Watanabe et al. | |
| 2008/0219601 A1 | 9/2008 | Arai et al. | |
| 2008/0247021 A1 | 10/2008 | Ichii | |
| 2008/0266633 A1 | 10/2008 | Hirakawa et al. | |
| 2008/0267662 A1 | 10/2008 | Arai et al. | |
| 2008/0267663 A1 | 10/2008 | Ichii et al. | |
| 2008/0284838 A1 | 11/2008 | Suzuki et al. | |
| 2008/0285104 A1 | 11/2008 | Arai et al. | |
| 2009/0052944 A1 | 2/2009 | Kubo et al. | |
| 2009/0060582 A1 | 3/2009 | Ichii et al. | |
| 2009/0060583 A1 | 3/2009 | Amada et al. | |
| 2009/0065685 A1 | 3/2009 | Watanabe et al. | |

FOREIGN PATENT DOCUMENTS

| | | |
|---|---|---|
| JP | 2004-287292 | 10/2004 |
| JP | 2005-250319 | 9/2005 |

OTHER PUBLICATIONS

U.S. Appl. No. 11/993,406, filed Apr. 27, 2007.

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-163188 filed in Japan on Jun. 23, 2008.

BACKGROUND OF THE INVENTION

1. Field of the Invention

The present invention relates to an optical scanning device and an image forming apparatus.

2. Description of the Related Art

A method for forming an image using a laser is widely used for obtaining a high-definition and high-quality image in an image recording field using electrophotographic technology. In the case of the electrophotography, typically, a latent image is formed on a photosensitive drum by rotating the drum in a sub-scanning direction while scanning the surface thereof with laser beams using a polygon mirror in an axial direction (a main-scanning direction) of the drum. In the field of electrophotography, there is a demand for forming a high-density image at high speed. Although high density and high speed have a trade-off relationship, it is required to achieve high speed and high density image formation.

One approach to achieve the high speed and high density image formation is to rotate the polygon mirror at a high speed. However, the high-speed rotation of the polygon mirror leads to increase of noises, increase of power consumption, and degradation of durability. A multibeam scanning device that does not have these problems has been put into practice. Specifically, the multibeam scanning device uses a light source unit in which a plurality of edge emitting laser diodes is combined (see Japanese Patent Application Laid-open No. 2005-250319), a one-dimensional edge emitting laser diode array, or a two-dimensional laser diode array.

In the light source unit in which a plurality of edge emitting laser diodes is combined, a manufacturing cost is low because a general-purpose laser diode can be used. However, it is difficult to keep a relative position relation stable between the laser diodes and a coupling lens with respect to a plurality of beams, and thus a scan-line interval formed on a scanning surface by the beams becomes uneven. Moreover, because it is difficult to use extremely large number of light sources in this method, ultrahigh density and ultrahigh speed image formation cannot be achieved.

The one-dimensional edge emitting laser diode array can have a uniform scan-line interval. However, power consumption of elements increases. When the number of beams is too large, a deviance of the beams from the optical axis of the optical element of an optical system increases, and thus an optical characteristic degrades.

On the other hand, a surface emitting laser such as a vertical-cavity surface-emitting laser (VCSEL) is a semiconductor laser that emits light in a direction perpendicular to a substrate thereof, and thus can be easily integrated in a two-dimensional manner. Furthermore, the surface emitting laser consumes power that is about one digit less than the edge emitting laser. In this way, the surface emitting laser is advantageous in integrating more light sources in a two-dimensional manner.

A writing optical system for scanning light beams using a polygon mirror has been disclosed in, for example, Japanese Patent Application Laid-open No. 2004-287292, in addition to Japanese Patent Application Laid-open No. 2005-250319. In the surface emitting laser, light sources are easily arrayed in a two-dimensional manner and thus the number of beams can be increased compared with the edge emitting laser diode.

However, because a distance in the sub-scanning direction between beams at both ends in a single scanning gets longer as the number of beams is increased, a deviance of the scan-line interval (hereinafter, a sub-scanning beam pitch) becomes large when the magnification of the optical system of the optical scanning device deviates from a desired value.

SUMMARY OF THE INVENTION

It is an object of the present invention to at least partially solve the problems in the conventional technology.

According to an aspect of the present invention, there is provided an optical scanning device including a light source that includes a plurality of light emitting points arrayed in a two-dimensional manner; a coupling unit that couples light beams output from the light emitting points of the light source as coupled light beams; a deflecting unit that deflects the coupled light beams output from the coupling unit as deflected light beams; a scanning optical system that guides the deflected light beams output from the deflecting unit to a scanning surface; an adjusting member that is arranged between the coupling unit and the deflecting unit and has a negative optical power at least in a sub-scanning direction; and a line-image forming member that is arranged between the adjusting member and the deflecting unit and has a positive optical power at least in the sub-scanning direction. Positions of the coupling unit and the adjusting member are adjustable in an optical axis direction and once position adjustment is completed the coupling unit and the adjusting member are bonded with ultraviolet curing resin after adjustment According to another aspect of the present invention, there is provided an image forming apparatus including a latent image forming unit that forms a latent image on a scanning surface; a developing unit that develops the latent image with toner to form a toner image on the scanning surface; a transferring unit that transfers the toner image onto a recording medium; and a fixing unit that fixes the toner image transferred onto the recording medium to the recording medium. The latent image forming unit includes the above optical scanning device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1A:
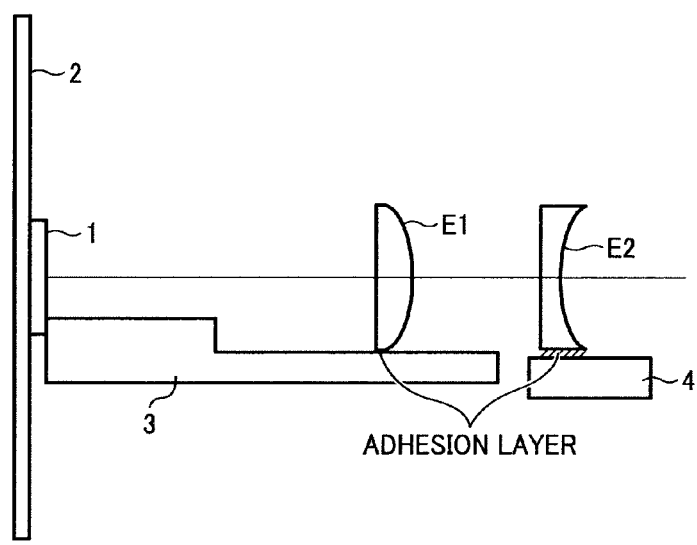
FIGS. 1A and 1B are schematic diagrams illustrating a partial configuration of an optical scanning device according to an embodiment of the present invention.
Figure 1B:
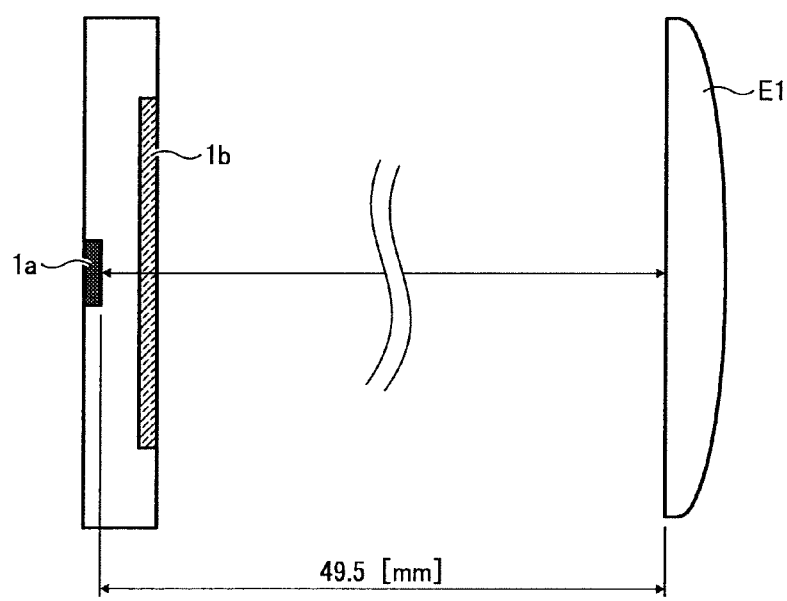

FIGS. 1A and 1B are schematic diagrams illustrating a partial configuration of an optical scanning device according to an embodiment of the present invention that is used in a laser printer, a digital copier, a plain paper facsimile machine, or the like. As shown in FIGS. 1A and 1B, the optical scanning device includes a light source 1, a light-source board 2, a first lens holder 3, a second lens holder 4, a coupling lens E1, and an adjusting lens E2. The light source 1 includes a two-dimensional light source array 1a and a cover glass 1b. The thickness of the cover glass 1b is, for example, 0.3 millimeter (mm).

Figure 2:
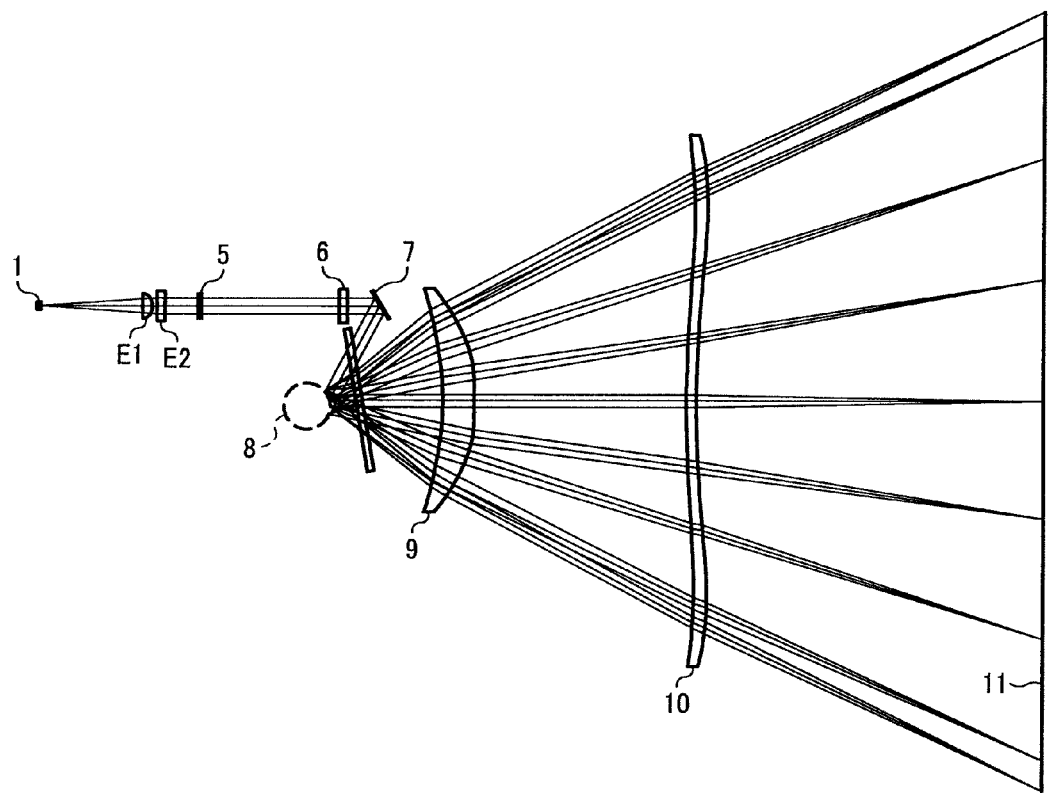
FIG. 2 is a plan view of a configuration of the optical scanning device according to the present embodiment of the present invention.

FIG. 2 is a plan view of an entire configuration of the optical scanning device. As shown in FIG. 2, the optical scanning device further includes an aperture 5, a line-image forming lens 6, a reflecting mirror 7, a deflecting unit 8, and first and second scanning lenses 9 and 10. The optical scanning device scans a scanning surface 11.

The light source 1 is electrically connected to the light-source board 2 that drives the light source 1. When the light-source board 2 drives the light source 1, the light source 1 emits light beams. The position of the coupling lens E1 is adjusted in an optical axis direction and then bonded on the first lens holder 3. The coupling lens E1 converts divergent beams into convergent beams. The adjusting lens E2 is held on the second lens holder 4 and it converts the convergent beams into substantially parallel beams. The lenses E1 and E2 adjust light beams emitted from the light source 1 to a shape that is suitable for the system. A conventional optical system uses only the lens E1 to adjust the shape of beam. However, because the optical scanning device according to the present embodiment includes the adjusting lens E2, it is possible to adjust magnification in addition to the shape of beam.

The aperture 5 further shapes the light beams. The line-image forming lens 6, which can be a cylindrical lens, converts the light beams into a line image that is perpendicular to the rotation axis of the deflecting unit 8 at a reflecting surface (a deflection surface) of the deflecting unit 8. The reflecting mirror 7 reflects the line image to the deflecting unit 8, and then the deflecting unit 8 deflects the reflected line image on the scanning surface 11 to scan the scanning surface 11.

Table 1 indicates radiuses of curvature R, surface separations d, and refractive indexes n of the coupling lens E1 and the adjusting lens E2. A first surface R1 of the coupling lens E1 is plane and a second surface R2 thereof is spherical. The coupling lens E1 causes an aberration because its focal length is 43.8 mm and its optical power is high. However, the aberration is corrected because the adjusting lens E2 has an aspherical shape. The shape of the adjusting lens E2 is indicated in Table 1, and the aspherical shape of a second surface of the adjusting lens E2 is expressed by Equations (1) and (2) and Table 2. In this case, X is a coordinate value in the optical axis direction (a light emitting direction), Y is a coordinate value in a main-scanning direction, $C_{m0}$ (=$1/R_{m0}$) is a curvature in the main-scanning direction, and $C_S(Y)$ is a curvature in a sub-scanning direction at the coordinate value Y. As will be appreciated from Equations (1) and (2), a second surface of the adjusting lens E2 has the shape of a noncircular arc in the main-scanning direction and has the shape of a circular arc in the sub-scanning direction. The coupling lens E1 has a positive optical power and the adjusting lens E2 made of resin has a negative optical power. Therefore, the variation of the position of beam waist is less affected by the temperature variation in the optical scanning device. The line-image forming lens 6 is made of glass.

TABLE 1

|  |  | R | d | n |
|---|---|---|---|---|
| E1 | R1 | ∞ | 3 | 1.511146 |
|  | R2 | −22.4 | 12 | 1 |
| E2 | R1 | ∞ | 2 | 1.523923 |
|  | R2 | 150 | — | — |

$$X(Y) = \frac{C_{m0} \cdot Y^2}{1 + \sqrt{1 - (1 + a_{00}) \cdot C_{m0}^2 \cdot Y^2}} + \qquad (1)$$
$$a_{01} \cdot Y + a_{02} \cdot Y^2 + a_{03} \cdot Y^3 + a_{04} \cdot Y^4 + \ldots$$

$$C_S(Y) = \frac{1}{R_{S0}} + b_{01} \cdot Y + b_{02} \cdot Y^2 + b_{03} \cdot Y^3 + \ldots \qquad (2)$$

TABLE 2

| $R_{m0}$ | 150 | $R_{s0}$ | 150 |
|---|---|---|---|
| $a_{00}$ | — | $b_{00}$ | — |
| $a_{01}$ | — | $b_{01}$ | — |
| $a_{02}$ | — | $b_{02}$ | — |
| $a_{03}$ | — | $b_{03}$ | — |
| $a_{04}$ | 2.784259E−05 | $b_{04}$ | — |
| $a_{05}$ | — | $b_{05}$ | — |
| $a_{06}$ | −4.437202E−06 | $b_{06}$ | — |
| $a_{07}$ | — | $b_{07}$ | — |
| $a_{08}$ | 2.682096E−07 | $b_{08}$ | — |

Figure 3:
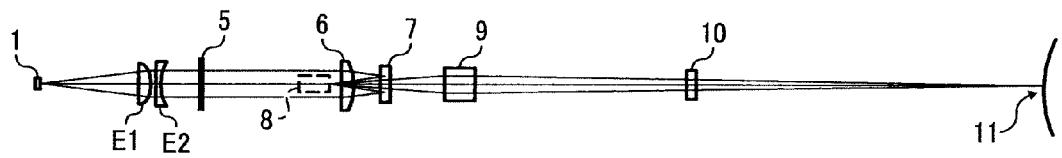
FIG. 3 is a side view of the optical scanning device shown in FIG. 2.
Figure 4A:
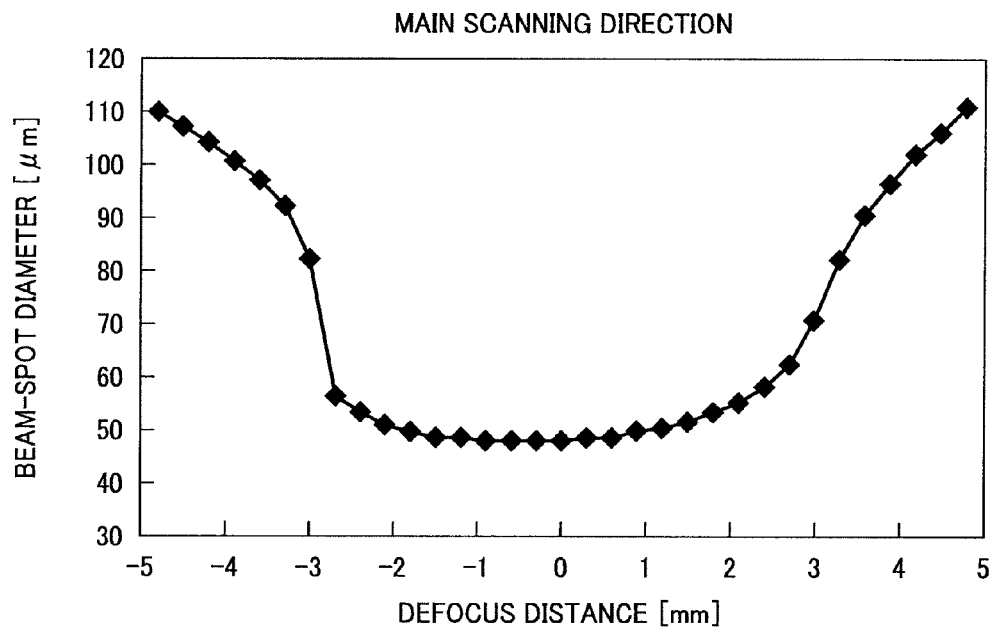
FIG. 4A is a graph illustrating the change of a beam-spot diameter on an image plane to the change of a defocus distance in a main-scanning direction.
Figure 4B:
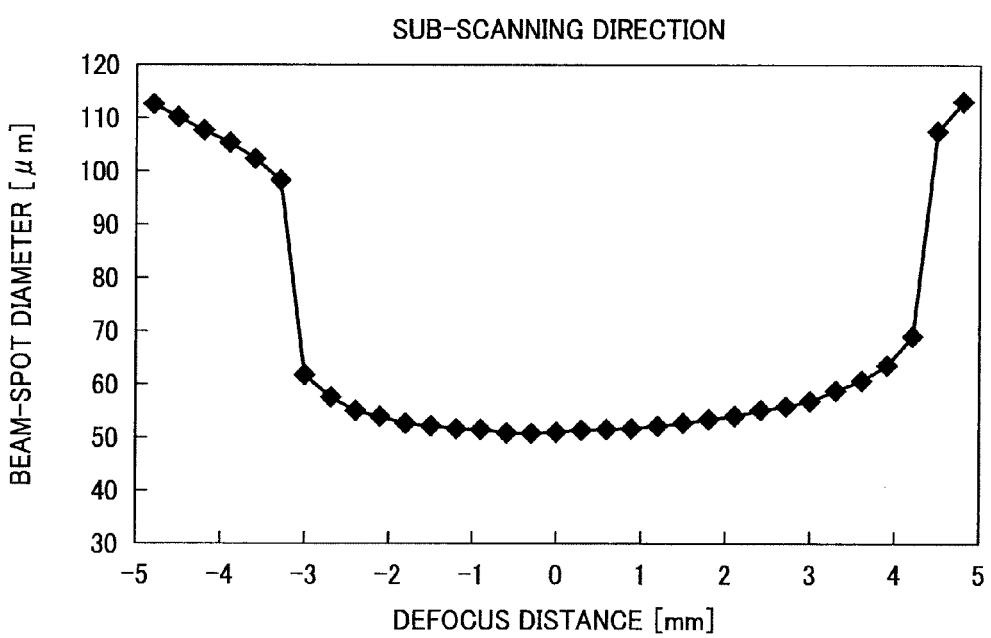
FIG. 4B is a graph illustrating the change of a beam-spot diameter on an image plane to the change of a defocus distance in a sub-scanning direction.
Figure 5A:
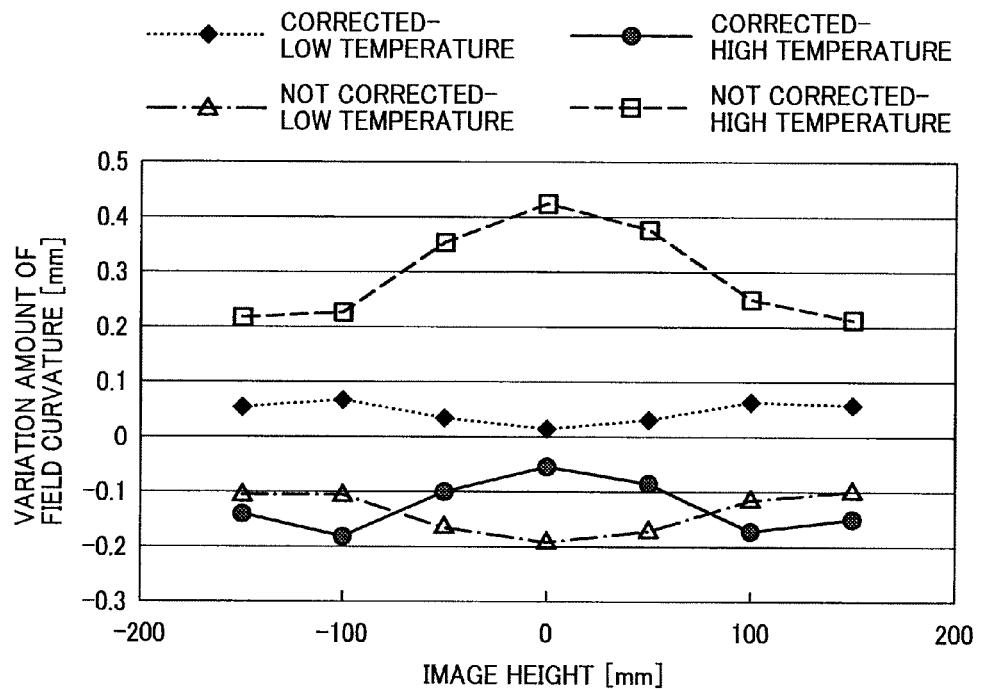
FIG. 5A is a graph illustrating a variation amount of a field curvature to an image height in the main-scanning direction.
Figure 5B:
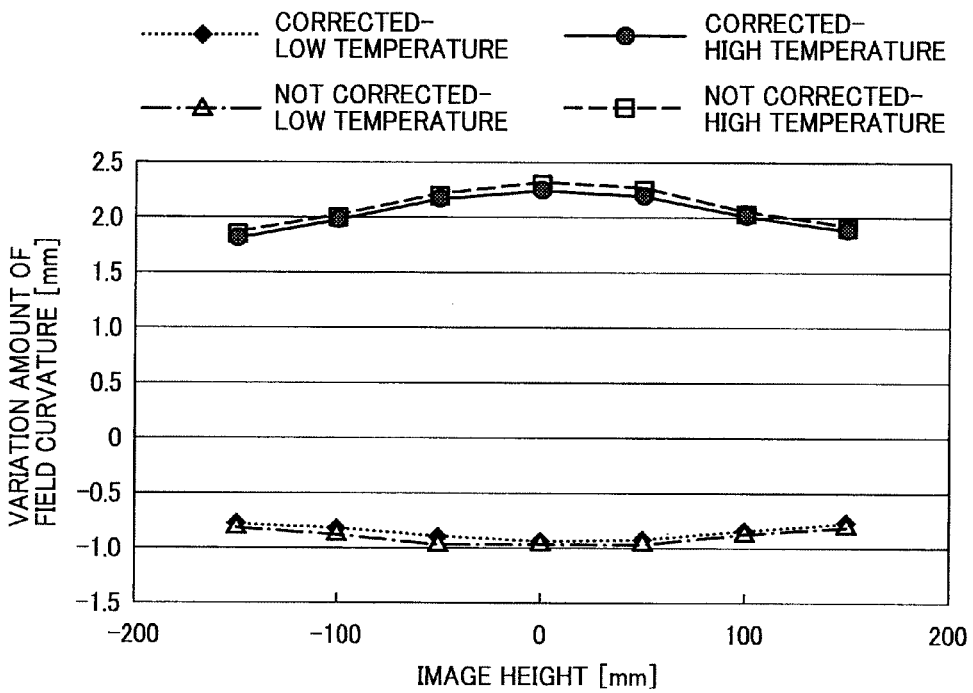
FIG. 5B is a graph illustrating a variation amount of a field curvature to an image height in the sub-scanning direction.

FIG. 3 is a side view of the optical scanning device shown in FIG. 2. FIG. 4A is a graph illustrating the change of a beam-spot diameter on an image plane to the change of a defocus distance in the main-scanning direction and FIG. 4B is a graph illustrating the change of a beam-spot diameter on an image plane to the change of a defocus distance in the sub-scanning direction. FIGS. 5A and 5B are graphs illustrating a variation of a beam waist according to a temperature change of the optical scanning device, in which FIG. 5A is a graph illustrating a variation amount of a field curvature to an image height in the main-scanning direction and FIG. 5B is a graph illustrating a variation amount of a field curvature to an image height in the sub-scanning direction.

The diameter of the aperture 5 is set to 5.8 mm in the main-scanning direction and 1.28 mm in the sub-scanning direction. The lateral magnification of the entire system is 4.8 times in the main-scanning direction and 1.2 times in the sub-scanning direction. The diameter of the beam spot near the image plane is as shown in FIGS. 5A and 5B. In FIGS. 5A and 5B, "with correction" means that the optical system is optimized using the configuration in which the adjusting lens E2 is appended to the optical system. On the other hand, "without correction" means that the optical system is optimized using a conventional configuration in which the adjusting lens E2 is not appended to the optical system. Therefore, according to the present embodiment, the variation of the beam-spot diameter can be suppressed small because the variation of the field curvature by a temperature change can effectively be reduced.

Figure 6A:
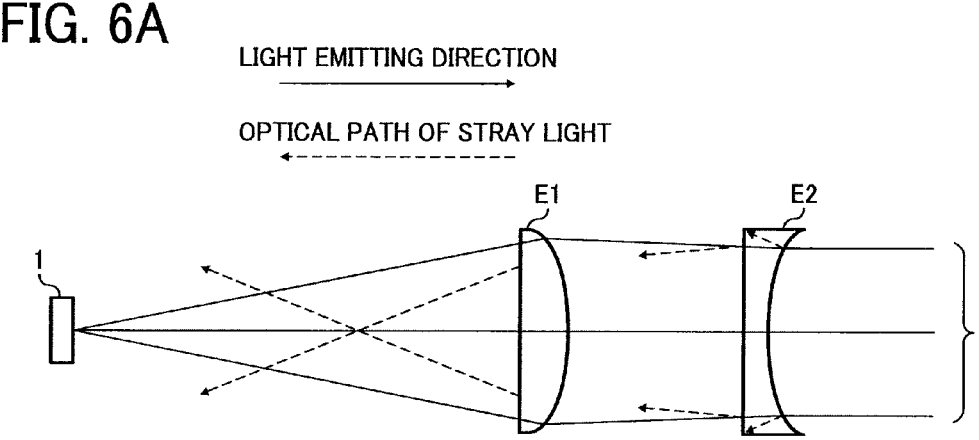
FIG. 6A is a schematic diagram for explaining light reflected by a coupling lens and an adjusting lens of the optical scanning device when stray light does not return to a light source.
Figure 6B:
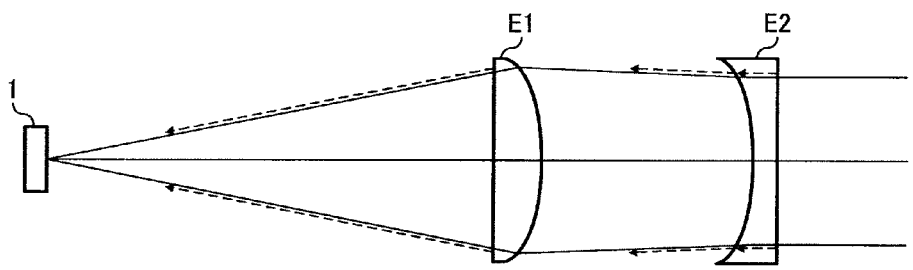
FIG. 6B is a schematic diagram for explaining light reflected by the coupling lens and the adjusting lens when stray light returns to the light source.

FIGS. 6A and 6B are schematic diagrams for explaining light reflected by the coupling lens E1 and the adjusting lens E2, in which FIG. 6A is a case where stray light does not return to the light source 1 and FIG. 6B is a case where stray light returns to the light source 1. In FIGS. 6A and 6B, dashed-arrow lines mean stray light that is light reflected from a lens surface.

According to the present embodiment, the diameter of the aperture is narrow in the sub-scanning direction, so that the aberration does not become worse in the sub-scanning direction. Therefore, the shape of the second surface of the adjusting lens E2 is a noncircular arc only in the main-scanning direction and is a circular arc in the sub-scanning direction. In this case, as shown in FIG. 6A, the adjusting lens E2 is configured such that the first surface of the adjusting lens E2 is a plane and the second surface is an aspherical shape. By this configuration, the directions of light beams incident on each surface of the adjusting lens E2 are not parallel to a normal line of the surface except central light. On the other hand, as shown in FIG. 6B, when the first surface is an aspheric surface and the second surface is a plane, reflected light backward traces the same optical path as the optical path when light beams are emitted and consequently returns to the light source 1 because the light beams are incident on the second surface to be perpendicular to the second surface (the light beams are parallel to the normal line).

As a result, the reflected light becomes stray light as shown in FIG. 6B. The optical system having the configuration as shown in FIG. 6A can prevent stray light reflected on the front and back surfaces of the adjusting lens E2 from returning to the light source 1 to degrade an oscillation state of a semiconductor laser and prevent the stray light from reflecting from the light source 1 and being incident on a scanning optical system to cause uneven image density, as show in FIG. 6B. Because the coating of lens made of resin is difficult from the viewpoint of processing, antireflective coating for the prevention of stray light results in cost increase. Therefore, the configuration of the present embodiment is adapted. Specifically, the following configuration is adapted. That is, "when marginal rays of light beams in the sub-scanning direction are incident on a lens having negative optical power in the sub-scanning direction and a lens having positive optical power in the sub-scanning direction, the incident rays and the normal line of the surface are not parallel to each other".

The detailed configuration of the present embodiment is explained. The shape of an optical surface of the scanning lens is expressed by Equations (1) and (2), and numeric values thereof are indicated in Table 3(a). X indicates a coordinate value in the optical axis direction (a direction parallel to a horizontal axis in FIG. 2), and Y indicates a coordinate value in the main-scanning direction. $C_{m0}$ $(=1/R_{m0})$ indicates a curvature of the center (Y=0) in the main-scanning direction. Moreover, $a_{00}, a_{01}, a_{02}, \ldots$ are aspheric-surface coefficients of the lens shape in the main-scanning direction. $C_S(Y)$ is a curvature in the sub-scanning direction at the coordinate value Y, and $R_{s0}$ indicates a curvature on the optical axis in the sub-scanning direction. In addition, $b_{00}, b_{01}, b_{02}, \ldots$ are aspheric-surface coefficients in the sub-scanning direction.

TABLE 3(a)

| | First Surface | Second Surface |
|---|---|---|
| $R_{nY}$ | −119.428 | −59.279 |
| $K_n$ | — | — |
| $A_n$ | 9.24816E−07 | 9.48532E−07 |
| $B_n$ | −2.62389E−10 | 7.41815E−11 |
| $C_n$ | 2.13479E−14 | −3.82368E−14 |
| $D_n$ | 1.59389E−17 | 1.07002E−17 |
| $E_n$ | −2.62569E−21 | 4.37611E−21 |
| $R_n$ | ∞ | ∞ |
| $a_n$ | 7.03138E−06 | — |
| $b_n$ | 2.95315E−10 | — |
| $c_n$ | −2.25975E−12 | — |
| $d_n$ | — | — |
| $e_n$ | — | — |
| $F_2$ | — | −5.73974E−06 |
| $F_4$ | — | −1.77749E−10 |
| $F_6$ | — | −1.55089E−13 |
| $F_8$ | — | −2.67364E−16 |
| $F_{10}$ | — | 4.16646E−20 |

TABLE 3(b)

| | First Surface | Second Surface |
|---|---|---|
| $R_{nY}$ | −10000 | 540.6253 |
| $K_n$ | — | — |
| $A_n$ | 3.285627E−07 | 1.277984E−07 |
| $B_n$ | −7.085422E−11 | −4.628731E−11 |
| $C_n$ | 6.269224E−15 | 4.049210E−15 |
| $D_n$ | −2.731570E−19 | −1.659747E−19 |
| $E_n$ | 4.738805E−24 | 2.585484E−24 |
| $R_{nZ}$ | ∞ | −37.94245 |
| $a_n$ | — | 1.317747E−06 |
| $b_n$ | — | −1.030720E−10 |
| $c_n$ | — | −8.744780E−15 |
| $d_n$ | — | 2.593978E−18 |
| $e_n$ | — | −2.436017E−22 |
| $f_n$ | — | 8.689978E−27 |
| $F_2$ | 3.477136E−07 | — |
| $F_4$ | −6.560344E−11 | — |
| $F_6$ | 7.601918E−15 | — |
| $F_8$ | −5.383658E−19 | — |
| $F_{10}$ | 1.947994E−23 | — |

The configuration of the optical scanning device is explained with reference to FIGS. 2 and 3. The optical scanning device includes the light source 1, a first optical system including the coupling lens E1 and the adjusting lens E2, a second optical system including the aperture 5 that is an opening and the line-image forming lens 6, and a scanning optical system (a third optical system) including the deflecting unit 8, the first scanning lens 9, and the second scanning lens 10. The scanning lenses are made of resin. Diffraction grating can be formed on one or more optical surfaces.

The light source 1 includes a plurality of light emitting points that are arrayed in a two-dimensional manner, and thus a plurality of light beams can be emitted from one light source. Such a light source can be realized by a technique of a vertical-cavity surface-emitting laser (VCSEL). Because a temperature fluctuation of an oscillation wavelength is small and a discontinuous change (wavelength jump) of a wavelength does not theoretically occur in the VCESL, optical characteristics is hardly degraded due to the change of wavelength even when the environment is changed.

The line-image forming lens 6 is made of glass to suppress a variation by the change of temperature. The lenses E1 and E2 has a synthetic focal length F1=49.3 mm to make light beams substantially parallel. The line-image forming lens 6 has a focal length F2=60.8 mm to focus light beams in the sub-scanning direction near a reflecting surface for deflection.

The aperture 5 limits a light beam in the main-scanning direction and the sub-scanning direction to adjust a diameter of a beam spot. The aperture 5 is rectangular or elliptical in shape having 5.9 mm in the main-scanning direction and 1.28 mm in the sub-scanning direction. The deflecting unit 8 is a four-sided mirror of which the radius of an inscribed circle is 8 mm, and rotates at a constant velocity around an axis parallel to the sub-scanning direction. An effective range of one reflecting surface is 7.8 mm×2.0 mm.

The light source 1 is the VCSEL, its oscillation wavelength is 780 nanometers (nm), its divergence angle (FWHM) is 6.8±1 degrees in both directions of the main-scanning direction and the sub-scanning direction, and its light emitting area is a circle of which a diameter is 4 micrometers (μm). The diameter of the light emitting area has a value of $1/e^2$ of the peak of intensity distribution (near-field pattern) of output light.

The central thickness (on the optical axis) of the first scanning lens 9 is 13.5 mm, and the central thickness of the second scanning lens 10 is 3.5 mm. The lateral magnification of the entire optical system is 1.19 times in the sub-scanning direction, and the lateral magnification of only the scanning optical system is −0.97 times in the sub-scanning direction. A focal length of the scanning optical system is 237.8 mm in the main-scanning direction and 71.3 mm in the sub-scanning direction. A width of writing is ±161.5 mm. The target diameter of the beam spot is 55 μm in the main-scanning direction and 55 μm in the sub-scanning direction. The distance from an output surface of the first scanning lens 9 to an input surface of the second scanning lens 10 is 89.76 mm, and the distance from an output surface of the second scanning lens 10 to the scanning surface is 143.52 mm.

Another embodiment of the scanning optical system is explained with reference to Equations (3), (4), and (5) and Table 3(b). In this embodiment, an angle of a normal line of the surface of the scanning lens to the sub-scanning direction changes according to each height of the lens and light beams are obliquely incident on the deflecting unit 8 in the sub-scanning direction. By this configuration, stray light by reflection from the scanning lens does not reach the scanning surface.

$$C_m = 1/R_{nY} \quad (3)$$

$$C_S(Y) = 1/R_{nZ} + a_n \cdot Y^2 + b_n \cdot Y^4 + c_n \cdot Y^6 + d_n \cdot Y^8 + e_n \cdot Y^{10} + f_n \cdot Y^{12} \quad (4)$$

$$X_n(Y,Z) = \frac{Y \cdot C_m}{1 - \sqrt{1 - (1+K_n) \cdot (Y \cdot C_m)^2}} + A_n \cdot Y^4 + B_n \cdot Y^6 + \quad (5)$$

$$C_n \cdot Y^8 + D_n \cdot Y^{10} + E_n \cdot Y^{12} + \frac{C_m \cdot (Y) \cdot Z^2}{1 - \sqrt{1 - (C_s \cdot (Y) \cdot Z)^2}} +$$

$$(F_2 \cdot Y^2 + F_4 \cdot Y^4 + F_6 \cdot Y^6 + F_8 \cdot Y^8 + F_{10} \cdot Y^{10}) \cdot Z$$

Next, the adjustment of the coupling lens E1 and the adjusting lens E2 is explained. In the conventional optical scanning device the focal position adjustment is typically performed by changing light beams output from the light source into any one of parallel beams, convergent beams, and divergent beams by means of the optical-axis-direction adjustment of the coupling lens E1. However, when a curvature radius of an element is different due to a manufacturing error, that is, a focal length of the element is different, the interval between beam spots is deviated on an image plane because an lateral magnification error occurs.

Therefore, by adjusting a relative distance between the adjusting lens E2 and the line-image forming lens 6 in the optical axis direction, a synthetic focal length of the adjusting lens E2, which has negative optical power in the sub-scanning direction, and the line-image forming lens 6, which has positive optical power in the sub-scanning direction, can be adjusted in the sub-scanning direction, and the lateral magnification of the entire system can be adjusted in the sub-scanning direction. Particularly, unlike with a light source that employs a one-dimensional-array configuration, the light source of which light emitting points are arrayed in a two-dimensional manner needs the configuration of the present invention because a beam pitch in the sub-scanning direction cannot be adjusted by a method for adjusting the arrangement of the light source around the optical axis.

Figure 7:
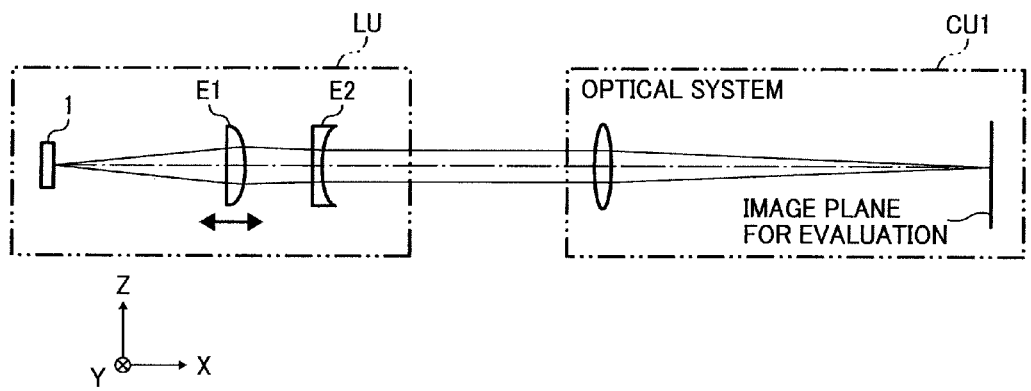
FIG. 7 is a schematic diagram for explaining an adjustment procedure of a focal position of the coupling lens and the adjusting lens.

The method for adjusting the adjusting lens E2 is explained with reference to FIGS. 7 and 8. FIG. 7 is a schematic diagram for explaining an adjustment procedure of a focal position of the coupling lens E1 and the adjusting lens E2.

As shown in FIG. 7, an optical system unit LU includes the light source 1, the coupling lens E1, and the adjusting lens E2, and an evaluation unit CU1 includes the optical system and an image plane for evaluation. The position of the optical system unit LU is adjusted so that the optical system unit LU is at a predetermined distance from the evaluation unit CU1. This adjustment is performed by moving the coupling lens E1 in the optical axis direction (X-axis direction) so that a light beam emitted from the central light emitting point of the light source 1 is focused on the center of an image plane for evaluation of the evaluation unit CU1. The coupling lens E1 is fixed at this position, and then is bonded to the first lens holder 3 as described below.

Figure 8:
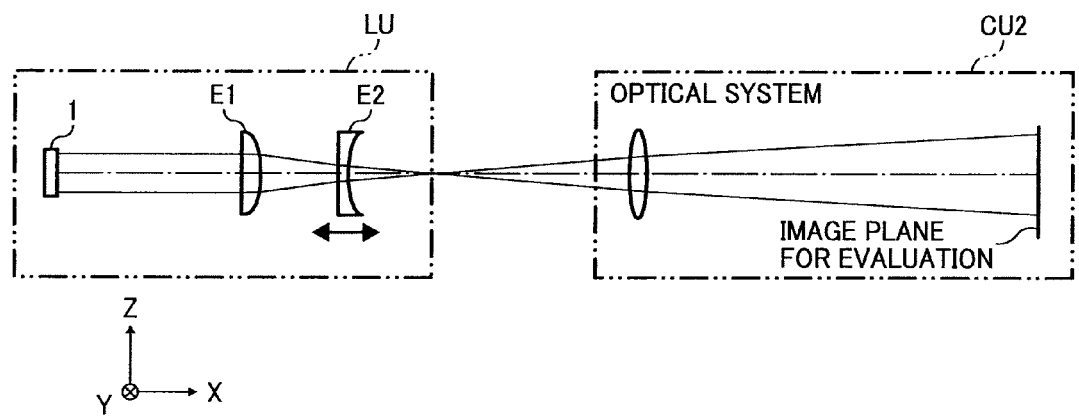
FIG. 8 is a schematic diagram for explaining a procedure of adjusting a lateral magnification of the optical system.

FIG. 8 is a schematic diagram for explaining a procedure of adjusting lateral magnification of the optical system similarly to FIG. 7. The adjustment of lateral magnification is performed by moving the adjusting lens E2 in the X-axis direction so that the beam pitch of light beams emitted from the light emitting points of the light source 1 becomes a desired value on the image plane for evaluation of an evaluation unit CU2. In this case, a focal length of an optical system of the evaluation unit CU2 is 98.4 mm. In the optical scanning device, desired lateral magnification in the sub-scanning direction is twice. For example, the adjusting lens E2 is moved in the X-axis direction so that a beam pitch of light beams emitted from two light emitting points that are placed 393 μm apart from each other in a Z-axis direction becomes 786 μm on the image plane for evaluation of the evaluation unit CU2. In this way, even if curvature radiuses of the coupling lens E1 and the adjusting lens E2 have a certain level of error (for example, manufacturing error), a synthetic focal length of the coupling optical system can have a desired value (in the present embodiment, 49.2 mm) and thus an error of an interval of scan lines on the scanning surface can be reduced when the optical system unit is used in the optical scanning device. In other words, an error of lateral magnification of the whole optical system in the sub-scanning direction can be less than or equal to a desired level.

Although the focal position of the whole optical system may change when adjusting the position of the adjusting lens E2, the change of the focal position is extremely small because an absolute value of optical power of the coupling lens E1 is larger than that of the adjusting lens E2.

After performing such an adjustment, the lateral side of the adjusting lens E2 is bonded to the second lens holder 4 as illustrated in FIG. 1. At this time, it is desirable that both of the coupling lens E1 and the adjusting lens E2 be bonded with ultraviolet (UV) curing resin so that the adjusted position is not changed. In this way, because the optical scanning device does not have a positioning unit for positioning the lens in the optical axis direction, the space between the lenses can be reduced, an adjustment space can be broadened, and thus the lenses can be arranged with higher accuracy. An adjusting member is configured not to include a portion to which the lenses are abutted in the optical axis direction. In such a case, it is assumed that the optical scanning device practically includes an adjusting member in the optical axis direction.

One surface of the adjusting lens E2 having negative optical power in the sub-scanning direction and one surface of the line-image forming lens 6 having positive optical power in the sub-scanning direction each have a rotation-symmetric shape with respect to the optical axis. By employing such a configuration, the optical scanning device whose optical characteristic degrades little due to eccentricity between surfaces (particularly, around the optical axis) can be realized. Moreover, according to the present invention, the lens having positive optical power in the sub-scanning direction can be adjusted in a direction vertical to the optical axis, and thus deviation of the beam pitch in the sub-scanning direction according to the height of image can be reduced and a good optical characteristic can be obtained.

By adjusting the light source around the optical axis, the light emitting points of the light source can be arrayed in an ideal two-dimensional manner and the beam pitch in the sub-scanning direction can have a desired value.

Figure 9:
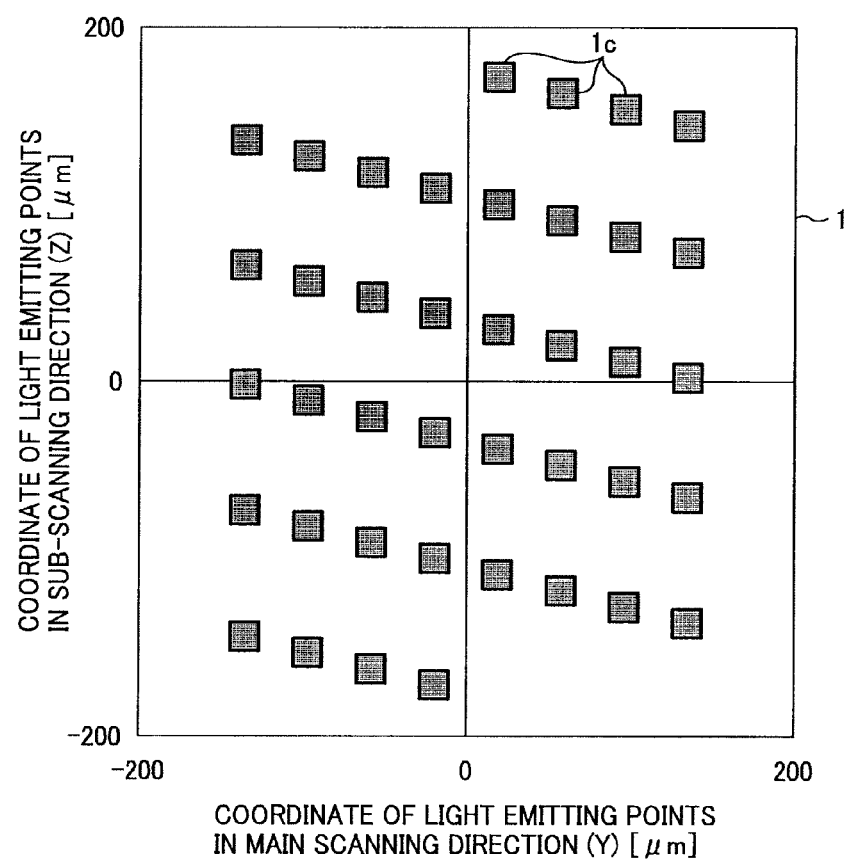
FIG. 9 is a schematic diagram illustrating an array of light emitting points of the light source that can be used in the present embodiment.

FIG. 9 is a schematic diagram illustrating an array of light emitting points 1c of the light source 1 that can be used in the present embodiment. In the light emitting points 1c arrayed in a two-dimensional manner, a distance between both ends in the sub-scanning direction is longer than a distance of both ends in the main-scanning direction. In such a case, a good optical characteristic is obtained because vignetting of light beams does not occur on a polygon mirror.

Figure 10:
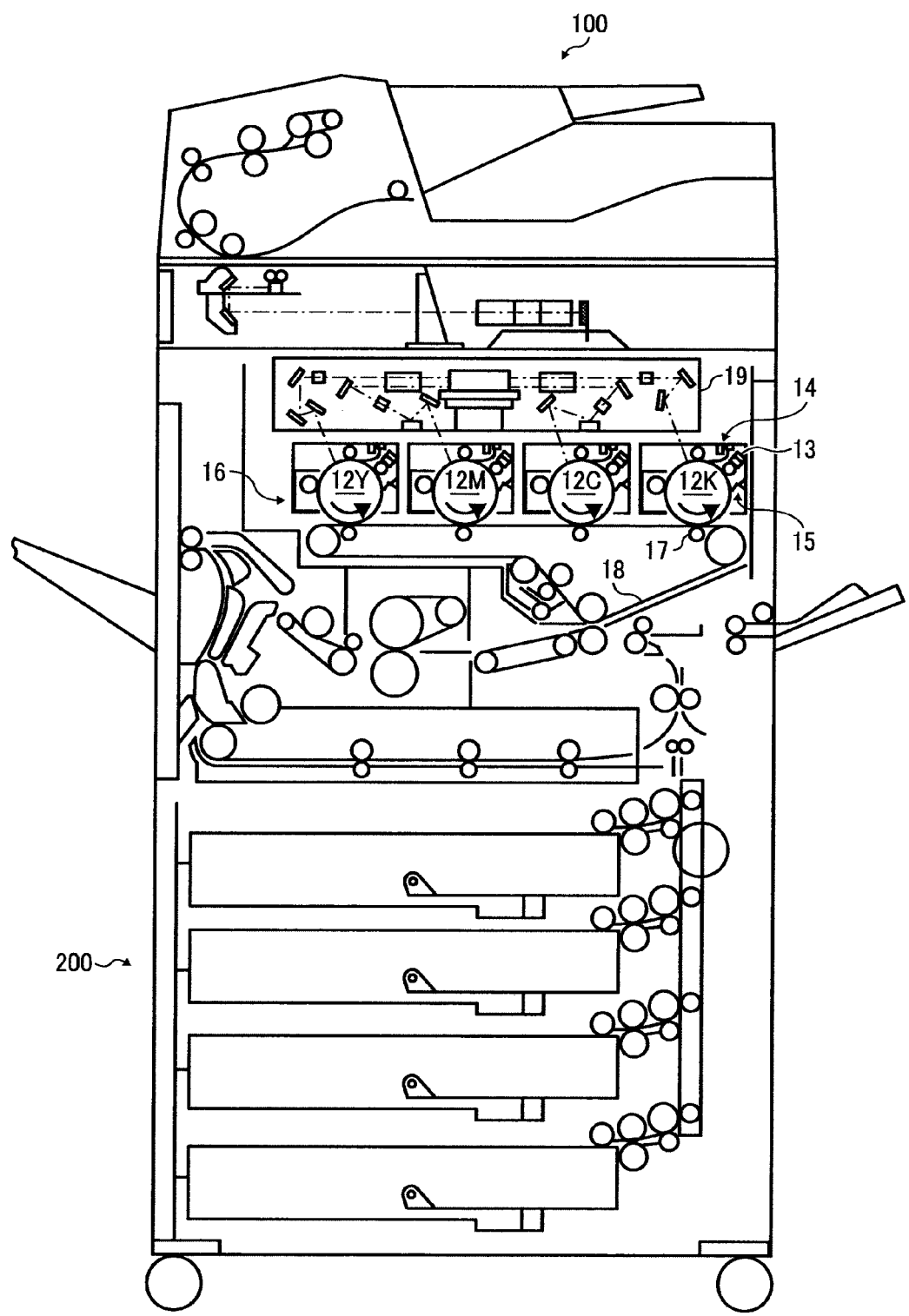
FIG. 10 is a schematic side view illustrating an example of an internal configuration of an image forming apparatus including the optical scanning device according to the embodiment.

FIG. 10 is a schematic view illustrating an example of internal configuration of an image forming apparatus 100 including the optical scanning device according to the present embodiment. Additional characters Y, M, C, and K indicate development colors of yellow, magenta, cyan, and black, respectively. A protective-layer forming device 13, a charging device 14, an optical scanning device 19, a developing device 16, a transferring device 17, and a cleaning device 15 are arranged around a drum-shaped image carrier 12, and these devices perform operations for forming an image according to the following operations.

A series of processes for forming an image is explained using a negative-positive process. The image carrier 12 as represented by an organic photo conductor (OPC) that includes an organic photoconductive layer is neutralized by a neutralizing lamp (not shown), and is uniformly charged negatively by the charging device 14 that includes a charging unit. When the image carrier 12 is being charged by the charging device 14, a suitable voltage or a charged voltage obtained by superimposing an alternating voltage on the suitable voltage, which is suitable to charge the image carrier 12 to a desired electric potential, is applied from a voltage applying device (not shown) to the charging unit. The charged image carrier 12 is exposed to laser light emitted from the optical scanning device 19 such as a laser optical system based on image data so that an absolute value of an electric potential of an exposed portion is smaller than that of an unexposed portion, whereby a latent image is formed on the image carrier 12.

The laser light is emitted from a semiconductor laser, and is scanned on the surface of the image carrier 12 in a rotational-axis direction of the image carrier 12 by means of a multi-sided polygon mirror that rotates at high speed. The latent image formed in this way is developed by toner particles or a developer consisting of toner particles and carrier particles, supplied on a developing sleeve that is a developer carrier in the developing device 16, and results in a toner image. For developing the latent image, a predetermined voltage or a development bias voltage obtained by superimposing an alternating voltage on the predetermined voltage, which is between the voltage of the exposed portion and the voltage of the unexposed portions of the image carrier 12, is applied from the voltage applying device (not shown) to the developing sleeve.

The toner image formed on the image carrier 12 corresponding to each color is transferred onto an intermediate transfer medium 18 by the transferring device 17, and the transferred image is transferred onto a printing medium such as paper fed from a feeder 200. At this time, it is preferable that the transferring device 17 be supplied with an electric potential having a polarity opposite to that of toner as a transfer bias voltage. After that, the intermediate transfer medium 18 is separated from the image carrier 12 to obtain a transferred image. Meanwhile, toner particles remaining on the image carrier 12 are collected by a cleaning unit into a toner collecting unit included in the cleaning device 15.

The image forming apparatus can be an apparatus that sequentially transfers onto printing medium a plurality of toner images having different colors sequentially made by a plurality of developing devices, sends the printing medium to a fixing device, and fixes the toner images to the printing medium by heat. Alternatively, the image forming apparatus can be an apparatus that sequentially transfers onto the intermediate transfer medium a plurality of toner images made similarly to the above as illustrated in FIG. 10, and then transfers the toner images onto the printing medium and fixes the printing medium by heat.

Although the charging device 14 can employ a well-known configuration, it is preferable that the charging device 14 be provided in contact with or near the surface of the image carrier 12. Therefore, an amount of ozone generated during charging can largely be suppressed compared with a corona discharging device such as a corotron or a scorotron, which uses a discharging wire.

According to an aspect of the present invention, a desired sub-scanning beam pitch can be obtained on the surface of the image carrier, and a diameter of a beam waist can be kept stable even when a change of temperature occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source that includes a plurality of light emitting points arrayed in a two-dimensional manner;
a coupling unit that couples light beams output from the light emitting points of the light source as coupled light beams, wherein the coupling unit comprises a lens with a spherical surface;
a deflecting unit that deflects the coupled light beams output from the coupling unit as deflected light beams;
a scanning optical system that guides the deflected light beams output from the deflecting unit to a scanning surface;
an adjusting member that is arranged between the coupling unit and the deflecting unit and has a negative optical power at least in a sub-scanning direction, wherein the adjusting member has a lens with an aspherical surface; and
a line-image forming member that is arranged between the adjusting member and the deflecting unit and has a positive optical power at least in the sub-scanning direction, wherein
the adjusting member is mounted to be adjustable in an optical axis direction relative to the line-image forming member, the adjustable mounting of the adjusting member being fixable, whereby the position of the adjusting member in the optical axis direction relative to the line-image forming member may be fixed after the position of the adjusting member in the optical axis direction relative to the line-image forming member is adjusted to correct a beam pitch in the sub-scanning direction.

2. The optical scanning device according to claim 1, wherein a marginal ray of the light beams in the sub-scanning direction is incident on each of the adjusting member and the line-image forming member so as not to be parallel to a normal line of a surface of each of the adjusting member and the line-image forming member.

3. The optical scanning device according to claim 1, wherein
the adjusting member is made of resin, and
the line-image forming member is made of glass.

4. The optical scanning device according to claim 1, wherein one surface of each of the adjusting member and the line-image forming member has a rotation-symmetric shape with respect to an optical axis.

5. The optical scanning device according to claim 1, wherein a position of the line-image forming member is adjustable in a direction perpendicular to an optical axis.

6. The optical scanning device according to claim 1, wherein the light emitting points are rotation adjustable around an optical axis.

7. The optical scanning device according to claim 1, wherein a distance between both ends of the light emitting points in the sub-scanning direction is longer than that of the light emitting points in a main-scanning direction.

8. The optical scanning device according to claim 1, wherein the coupling unit has a planar incident surface and another surface that is spherical.

9. The optical scanning device according to claim 1, wherein the aspherical surface of the lens of the adjusting member is a non-circular arc in the main-scanning direction and a circular arc in the sub-scanning direction.

10. The optical scanning device according to claim 1, wherein the lens of the adjusting member has a planar incident surface and another surface that is a non-circular arc in the main-scanning direction and is an aspherical and circular arc in the sub-scanning direction.

11. An image forming apparatus comprising:
a latent image forming unit that forms a latent image on a scanning surface;
a developing unit that develops the latent image with toner to form a toner image on the scanning surface;
a transferring unit that transfers the toner image onto a recording medium; and
a fixing unit that fixes the toner image transferred onto the recording medium to the recording medium, wherein
the latent image forming unit includes an optical scanning device, the optical scanning device including
a light source that includes a plurality of light emitting points arrayed in a two-dimensional manner;
a coupling unit that couples light beams output from the light emitting points of the light source as coupled light beams, wherein the coupling unit comprises a lens with a spherical surface;
a deflecting unit that deflects the coupled light beams output from the coupling unit as deflected light beams;
a scanning optical system that guides the deflected light beams output from the deflecting unit to a scanning surface;
an adjusting member that is arranged between the coupling unit and the deflecting unit and has a negative optical power at least in a sub-scanning direction, wherein the adjusting member has a lens with an aspherical surface; and
a line-image forming member that is arranged between the adjusting member and the deflecting unit and has a positive optical power at least in the sub-scanning direction, wherein
the adjusting member is mounted to be adjustable in an optical axis direction relative to the line-image forming member, the adjustable mounting of the adjusting member being fixable, whereby the position of the fixing member in the optical axis direction relative to the line-image forming member may be fixed after the position of the adjusting member in the optical axis direction relative to the line-image forming member is adjusted to correct a beam pitch in the sub-scanning direction.

12. The image forming apparatus according to claim 11, wherein the coupling unit has a planar incident surface and another surface that is spherical.

13. The image forming apparatus according to claim 11, wherein the aspherical surface of the lens of the adjusting member is a non-circular arc in the main-scanning direction and a circular arc in the sub-scanning direction.

14. The image forming apparatus according to claim 11, wherein the lens of the adjusting member has a planar incident surface and another surface that is a non-circular arc in the main-scanning direction and is an aspherical and circular arc in the sub-scanning direction.

* * * * *